May 26, 1936. T. J. TAHENY 2,042,367
NONREFILLABLE BOTTLE
Filed Oct. 23, 1935
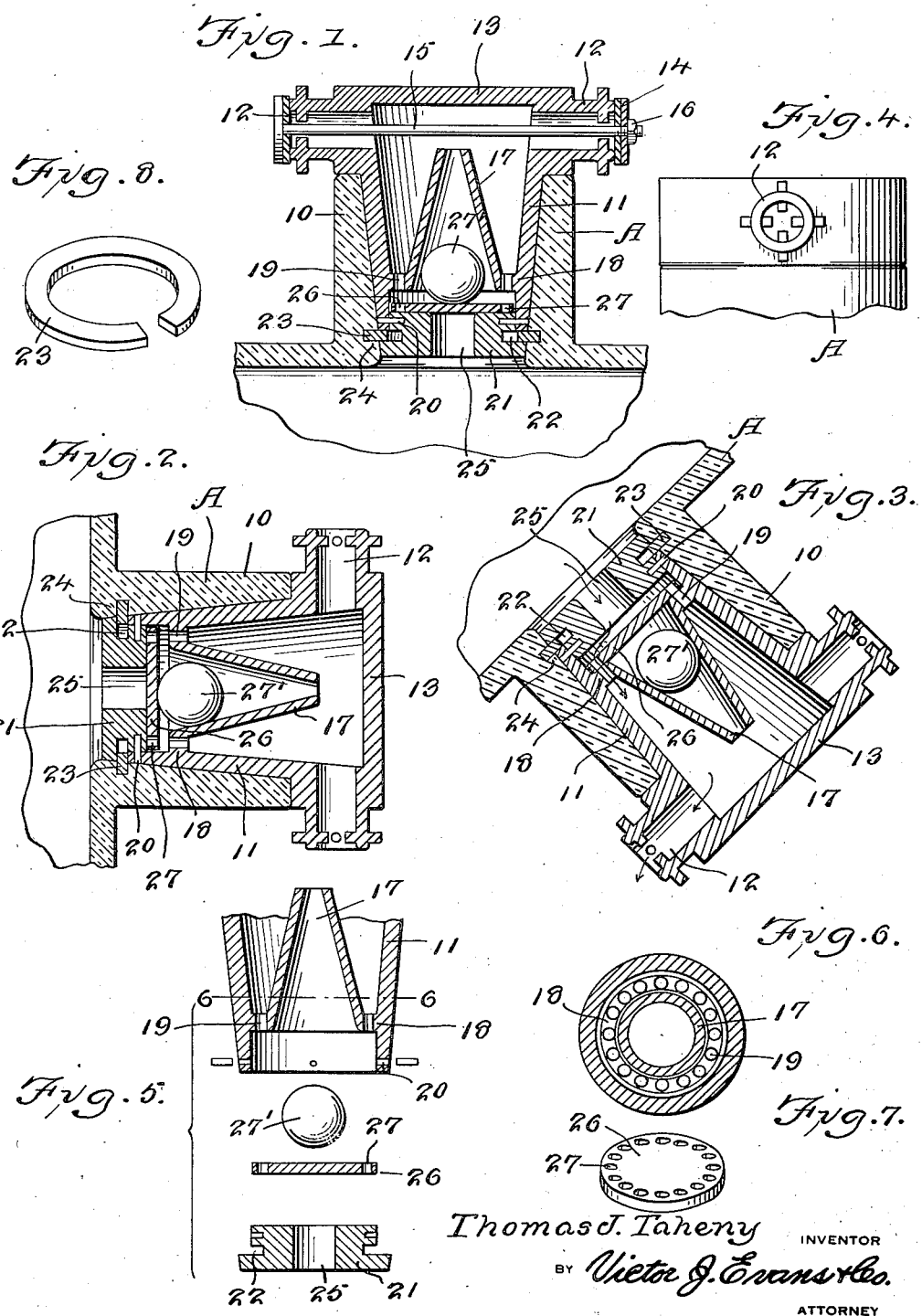
Thomas J. Taheny INVENTOR
BY Victor J. Evans & Co.
ATTORNEY Patented May 26, 1936

2,042,367

UNITED STATES PATENT OFFICE 2,042,367

NONREFILLABLE BOTTLE

Thomas J. Taheny, Pawtucket, R. I.

Application October 23, 1935, Serial No. 46,435

1 Claim. (Cl. 215—22)

The invention relates to a valved bottle and more especially to a non-refillable bottle stopper.

The primary object of the invention is the provision of a stopper of this character, wherein through the use of the same in the mouth of a bottle or other liquid container the genuineness of the contents can be assured because the bottle or the like can not be refilled after the dispensing of its original contents, the stopper being of novel construction and when engaged in the neck of the bottle will be anchored fast therein so that it is impossible to gain access to the interior yet permitting the dispensing of its contents.

Another object of the invention is the provision of a stopper of this character, wherein the bottle when in upright position will be sealed to avoid deterioration of the contents thereof and such contents can be readily and conveniently poured therefrom yet refilling of the bottle is prevented so that the genuineness of the contents can be assured as it is impossible to tamper with or in any manner deteriorate the same.

A further object of the invention is the provision of a stopper of this character, wherein a valve is operatively held therein to close the bottle yet permitting the pouring of its contents and should the bottle fall upon its side the contents will not flow therefrom and in this manner avoiding waste of the same.

A still further object of the invention is the provision of a stopper of this character, which is simple in construction, thoroughly reliable and efficient in its operation, readily and easily applied to a bottle or the like, strong, durable and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary vertical sectional view through a bottle showing the stopper constructed in accordance with the invention applied thereto.

Figure 2 is a view similar to Figure 1 showing the bottle tilted sidewise with the valve remaining closed.

Figure 3 is a view similar to Figure 2 showing the bottle inverted for the pouring of its contents.

Figure 4 is a fragmentary side elevation.

Figure 5 is an exploded sectional view showing the stopper assembly.

Figure 6 is a horizontal sectional view.

Figure 7 is a perspective view of the disk valve.

Figure 8 is a perspective view of the locking ring or anchoring member.

Similar reference characters indicate corresponding parts throughout the several views in the drawing.

Referring to the drawing in detail, A designates generally a portion of a bottle or other like container and into the mouth at the neck 10 thereof is introduced the stopper constituting the present invention and hereinafter fully described.

The stopper comprises a tapered hollow body 11 having laterally extending opposed pouring spouts 12 next to the outer larger closed end 13 thereof. Normally seated against these spouts are closure caps 14, one being integrally formed with a stem 15 which passes through the other cap and carries the threaded nut 16 to work against the latter as is clearly shown in Figure 1 of the drawing. In this manner the spouts 12 are sealed and on removal of the nut 16 from the stem 15 the closure caps 14 can be separated from the spouts for the opening thereof.

Interiorly of the body 11 and integrally formed therewith is a centrally located outwardly tapered nozzle 17 having in its connecting web 18 with the body 11 concentrically of said nozzle a plurality of outlet apertures or perforations 19.

This body 11 at its inner smaller end is telescoped onto and pinned at 20 to an anchoring piece 21 in the form of a comparatively thick disk, the same being provided with an external annular channel or groove 22 accommodating a split resilient ring 23 which is adapted to spring into a companion channel or groove 24 formed interiorly of the neck 10, the ring 23 being inherently springy and when engaged in the grooves 22 and 24 will firmly and permanently lock the stopper in the neck 10 of the bottle A.

The piece 21 has a center discharge opening 25 which when the bottle is in upright position is closed by a disk valve 26, it having perforations or apertures 27 concentrically for registration with the apertures or perforations 19 so that when the disk valve 26 is unseated from on the piece 21 the contents of the bottle A can freely flow through the discharge opening 25 and about the nozzle 17 for freely discharging through the spouts 12 on the tilting of such bottle to pouring position as is shown in Figure 3 of the drawing.

Located within the nozzle 17 and having perfect freedom of action therein is a ball weight 27' adapted to play upon the valved disk 26 for the automatic closing on the righting of the bottle or when the bottle is tilted upon its side. This weight 27 gravitates on the inclined wall nozzle 17 for action upon the disk valve 26 to maintain it in a closed position so as to avoid leakage of the contents from the bottle when the latter is in the position stated.

The tapered formation of the body 11 corresponds to the internal taper of the neck 10 of the bottle A and snugly fits within said neck when anchored therein.

The nozzle 17 prevents the weight 27' on inverting the bottle from escaping from the said nozzle or becoming freed in the body 11 outside of the nozzle.

It is impossible to force a filling of the bottle after the emptying thereof by pressure because the valved disk 26 will move against its seat closing the opening 25 in the piece 21 and the nozzle 17 constitutes a guard or hood to avoid any possibility, through the use of an instrument or other medium, of the lifting of the valve 26 from its seat upon the piece 21 to effect a refilling of the bottle.

The stopper in its construction assures genuineness to the original contents of the bottle and also the easy dispensing of such contents and eliminates the possibility of accidental leakage from the bottle should the same be side tilted at any angle than the pouring position or inverting of the same.

It is impossible to remove the stopper from the bottle unless breaking the same and the contents are protected against deterioration as the stopper is dust-proof and free from being tampered with.

What is claimed is:

A stopper of the character described, comprising an inverted substantially conical shaped hollow body open at its inner end and closed at its outer end, means for permanent anchorage of the body within a neck of a bottle, diametrically opposed pouring spouts on the body next to the closed end and extended laterally a considerable distance beyond the bottle neck, valve mechanism within the hollow body, sealing caps for said spouts, and a tie rod located within the spouts and separably joining the sealing caps for holding the same in sealing relation to said spouts.

THOMAS J. TAHENY.